(12) United States Patent
Naunheimer et al.

(10) Patent No.: US 7,901,640 B2
(45) Date of Patent: Mar. 8, 2011

(54) OPTIMIZED COUNTER-CURRENT FLOW BAFFLE

(75) Inventors: Christopher Naunheimer, Arlington Heights, IL (US); Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 478 days.

(21) Appl. No.: 12/119,570

(22) Filed: May 13, 2008

(65) Prior Publication Data

US 2009/0285732 A1  Nov. 19, 2009

(51) Int. Cl.
*B01J 8/08* (2006.01)
*B01J 35/02* (2006.01)

(52) U.S. Cl. ......................................... 422/219; 422/211

(58) Field of Classification Search .................. 422/219, 422/211
See application file for complete search history.

(56) References Cited

U.S. PATENT DOCUMENTS

| | | | |
|---|---|---|---|
| 3,480,406 A | 11/1969 | Luckenbach | 23/288 |
| 4,021,499 A | 5/1977 | Bieser | 260/674 SA |
| 4,036,779 A | 7/1977 | Schatz et al. | 252/417 |
| 4,079,094 A | 3/1978 | Rosback et al. | 260/674 SA |
| 4,108,915 A | 8/1978 | Rosback et al. | 260/674 SA |
| 4,126,539 A | 11/1978 | Derr, Jr. et al. | 208/108 |
| 4,193,910 A | 3/1980 | Rohrbach et al. | 260/42.43 |
| 4,251,675 A | 2/1981 | Engel | 585/422 |
| 4,435,279 A | 3/1984 | Busch et al. | 208/111 |
| 4,497,792 A | 2/1985 | Gindler | 424/3 |
| 4,567,022 A | 1/1986 | Greenwood | 422/144 |
| 4,571,326 A * | 2/1986 | Bischoff et al. | 422/207 |
| 4,721,603 A | 1/1988 | Krug et al. | 422/147 |
| 4,778,941 A | 10/1988 | Tagamolila | 585/319 |
| 5,128,109 A * | 7/1992 | Owen | 422/144 |
| 5,227,566 A * | 7/1993 | Cottrell et al. | 585/660 |
| 5,302,357 A | 4/1994 | Kramer et al. | 422/219 |
| 5,380,426 A | 1/1995 | Johnson et al. | 208/113 |
| 5,824,619 A * | 10/1998 | Sechrist et al. | 502/34 |
| 6,096,937 A | 8/2000 | Butler et al. | 585/440 |
| 6,106,702 A | 8/2000 | Sohn et al. | 208/310 Z |
| 6,225,518 B1 | 5/2001 | Sohn et al. | 585/826 |
| 6,612,731 B2 | 9/2003 | Nishida et al. | 366/173.2 |
| 6,706,938 B2 | 3/2004 | Roeseler et al. | 585/820 |

(Continued)

FOREIGN PATENT DOCUMENTS

GB   1128244   9/1968

OTHER PUBLICATIONS

U.S. Appl. No. 12/119,566, filed Nov. 19, 2009, Naunheimer et al.

(Continued)

*Primary Examiner* — Walter D Griffin
*Assistant Examiner* — Natasha Young
(74) *Attorney, Agent, or Firm* — Mark Goldberg

(57) ABSTRACT

A new reactor design is presented for a counter-current flowing reactor. The reactor has a catalyst flowing down through the reactor, and over baffles. Gas is admitted under the baffles and flows up through the solid catalyst bed. The design includes slotted plates that extend from the bottom of the baffle in the reactor to a position near the catalyst outlet. The gas flows through the slotted plates and is directed up through the catalyst bed, while directing the flowing catalyst to the catalyst outlet ports.

21 Claims, 3 Drawing Sheets

U.S. PATENT DOCUMENTS

| | | |
|---|---|---|
| 6,740,788 B1 | 5/2004 | Maher et al. ................... 585/319 |
| 6,762,335 B1 | 7/2004 | Prince et al. ................... 585/440 |
| 6,855,854 B1 | 2/2005 | James, Jr. ....................... 585/323 |
| 6,858,769 B2 | 2/2005 | Woodle et al. ................. 585/658 |
| 6,894,201 B1 | 5/2005 | Schmidt et al. ............... 585/448 |
| 7,094,939 B1 | 8/2006 | Jeanneret ....................... 585/323 |
| 7,105,711 B2 | 9/2006 | Merrill ........................... 585/266 |
| 7,118,715 B1 | 10/2006 | Hedrick et al. ................ 422/144 |
| 7,128,826 B2 | 10/2006 | Eldin et al. ................ 208/48 AA |
| 7,128,883 B2 | 10/2006 | James, Jr. ....................... 422/211 |
| 7,205,448 B2 | 4/2007 | Gajda et al. .................... 585/823 |
| 7,276,636 B2 | 10/2007 | Jeanneret ....................... 585/323 |

OTHER PUBLICATIONS

U.S. Appl. No. 12/119,569, filed Nov. 19, 2009, Naunheimer et al.

\* cited by examiner

OPTIMIZED COUNTER-CURRENT FLOW BAFFLE

FIELD OF THE INVENTION

This invention relates to counter-current flow reactors or adsorbers where a fluid flows up through a moving bed of catalyst or adsorbent. In particular, this relates to the internal components for controlling the flow of catalyst or adsorbent through the reactor or adsorber.

BACKGROUND OF THE INVENTION

A wide variety of processes use counter-current flow reactors to provide for contact between a fluid and a solid. The solid usually comprises a catalytic material on which the fluid reacts to form a product. The processes cover a range of processes, including hydrocarbon conversion, gas treatment, and adsorption for separation.

Counter-current reactors are constructed such that the reactor allows for catalyst, or adsorbent, to flow downward through the reactor, and the gas, or other fluid, flows upward contacting the catalyst. Since catalyst is heavy, and can exert significant force on the reactor internals, the construction has to be with a substantial material, such as thick steel plates. Counter-current reactors provide for continuous processing, with regenerated catalyst entering the reactor and flowing downward though the reactor, to be drawn off. The drawn off catalyst is recycled to a regenerator to refresh the catalyst for reuse. A problem with currently designed counter-current reactors is that the catalyst flows through and is collected in the bottom of the reactor. Significant amounts of the catalyst are bypassed as catalyst sits in the bottom of the reactor waiting to be drawn off for regeneration. In order to reduce the amount of catalyst situated at the bottom of the reactor, the current design is such that a substantial amount of catalyst is retained within the reactor in a non-flowing region. This presents a problem in that the catalyst will eventually be inactivated and is not taken out of the reactor, but creates a dead space where the reactant gas flows and is not processed.

Currently, screens for reactors are directed to reactors that have fluidized beds and where the screens prevent the passage of catalyst, or for radial flow reactors where the stresses on the screens are horizontal pressures. Other screens include high velocity flow processes where the solid particles need to be removed from the flow field. These reactors use different types of screens which are not applicable here.

The design of reactors to overcome these limitations can save significantly on catalyst that is held up in the reactor and does not flow, as well as catalyst that collects at the bottom of the reactor, and is by-passed by the flowing gas. The catalyst is one of the most significant costs associated with hydrocarbon processing, and reductions in amounts of catalyst used, or by-passed can result in significant savings. Improvements can increase the contact between the catalyst and fluid, and can reduce the amount of non-flowing catalyst.

SUMMARY OF THE INVENTION

The present invention is a counter-current flowing reactor, where catalyst flows downward with gravity, and a gas, or other fluid, flows upward and over the catalyst. The reactor includes a baffle structure for directing the catalyst in a downward direction, with gas admitted through an inlet and flowing under the baffle to then flow up and contact the catalyst. The reactor further includes a reactor bed plate to direct the catalyst to flow in an annular region for contacting the gas. The reactor also includes a plurality of slotted plates, where the plates extend from the bottom of the baffle to the bottom of the reactor near the catalyst outlet. The plates are arrayed in a circumferential manner to contain catalyst as the catalyst passes below the lower edge of the baffle. The region of inactive catalyst volume is reduced, and the overall amount of catalyst in the reactor is reduced.

Other objects, advantages and applications of the present invention will become apparent to those skilled in the art from the following detailed description and drawings.

DETAILED DESCRIPTION OF THE INVENTION

In a counter-current flowing reactor or adsorber, a solid catalyst or adsorbent flows downward through the reactor with the fluid flowing upward over the catalyst or adsorbent. For purposes of this description, a catalyst will be described, but the invention is applicable to an adsorber where the solid particulate material is an adsorbent. The reactor is of a design and the flow conditions are in the range to prevent fluidization of the solid catalyst particles in the reactor bed.

Figure 1:
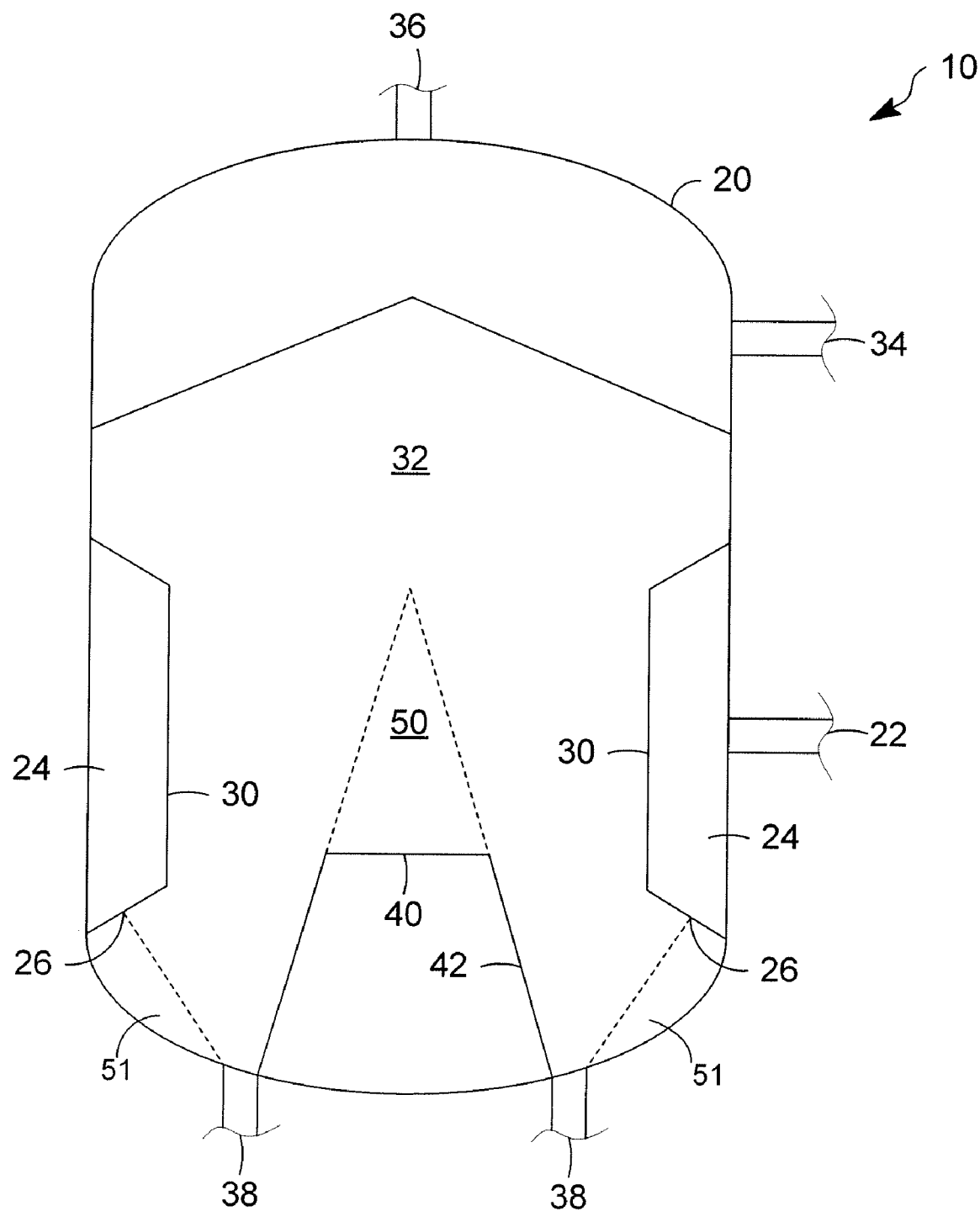
FIG. 1 is a design for a counter-current flowing reactor.

In a counter-current flowing reactor, the catalyst flows down by gravity through an opening and gas, or other fluid, is flowing upward through the opening, contacting the catalyst as it flows upward through the reactor. In many applications there is a desire to keep the catalyst flowing. In an annular baffle configuration, as shown in FIG. 1, the reactor 10 comprises an outer shell 20, with a baffle configuration 30 disposed within the shell 20, and a reactor bed plate 40 sized to direct the flow of catalyst through the reactor 10 and to direct the gas through the catalyst bed. A current design does not have any internal features, such as reactor bed plate 40, to direct the flow of catalyst out toward the catalyst outlets 38. The current design allows for the catalyst to flow downward and to collect in the bottom of the reactor. Gas enters the reactor 10 through a gas inlet 22, flows around the gap 24 between the reactor shell 20 and the baffle 30 and across the catalyst free surface 26, to flow upward through the catalyst bed 32 and out the gas outlet 34. Catalyst flows in through a catalyst inlet 36, through the catalyst bed 32 and out the catalyst outlets 38. Catalyst can be very heavy, and it is allowed to flow downward through the reactor bed and is collected at the bottom of the reactor 10 where the catalyst flows out the catalyst outlets 38.

A problem exists when the reactor increases in size. The applications have the design desire to keep an outer annular region of catalyst flowing, and the flowing catalyst creates a catalyst free surface 26 between the end of the baffle 30 and the reactor shell 20. When the reactor 10 is increased in size, the design creates significant no-flow zones 50 for the catalyst, and can be as high as 30% of the catalyst not flowing though the reactor, as well as creating zones where the fluid bypasses significant amounts of catalyst after the catalyst has passed below the bottom of the baffle 30. The no-flow zone 50 in this type of reactor is that region of catalyst above the bottom of the baffle 30 that is not flowing. Another no-flow zone 51 is the volume of catalyst under the catalyst free surface where catalyst is below a line defined by the angle of repose for the catalyst extending from the catalyst outlet 38.

The current state of the art with the counter-current reactor involves the collection of catalyst at the bottom of the reactor. In this design, there is a significant amount of catalyst in that region which does not flow to the catalyst outlets 38.

Figure 2:
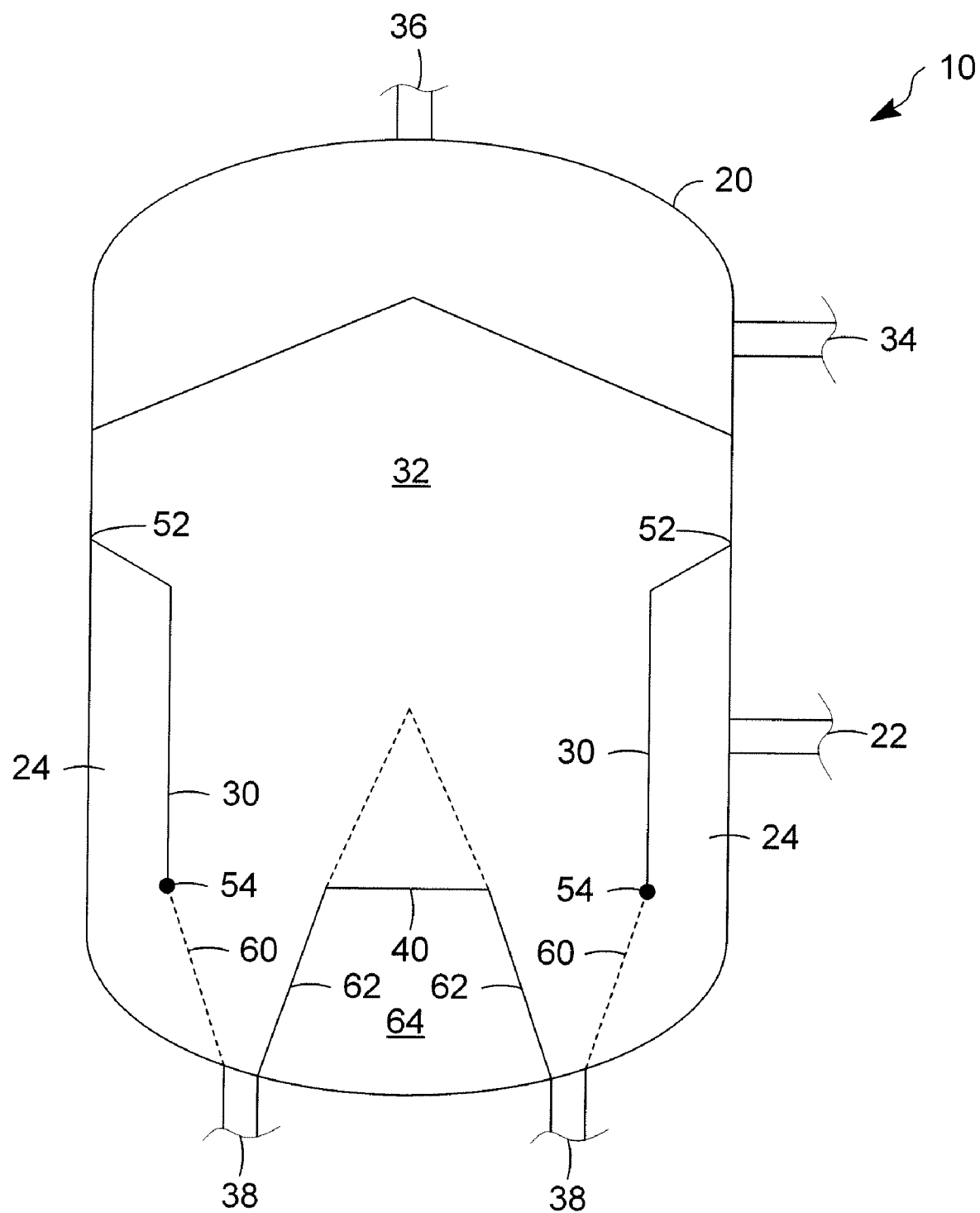
FIG. 2 is a new design for a counter-current flowing reactor.

The present invention is a cylindrical reactor that allows for more efficient contacting of the catalyst and fluid. The reactor 10, as shown in FIG. 2, includes a reactor housing 20 having a gas inlet 22, a gas outlet 34, a catalyst inlet 36 and catalyst outlets 38. The housing includes an annular baffle 30 having an upper edge 52 and a lower edge 54, where the upper edge 52 is affixed to the reactor housing 20 at a position above the gas inlet 22. The lower edge 54 extends below the gas inlet 22 and the baffle 30 creates an annular space 24 between the housing 20 and the baffle 30. The annular space 24 allows for the distribution of gas circumferentially around the reactor before the gas flows up through the catalyst bed 32. The reactor 10 includes a reactor bed plate 40 positioned in the reactor, and at a location that is approximately at the level of the lower edge 54 of the baffle 30. This creates an annular opening for the catalyst to flow through, and the bed plate 40 is sized to direct the rate of flow of catalyst through the reactor 10, and to maintain a reactor bed 32 residence time for the catalyst. The reactor 10 further includes a plurality of slotted plates 60. The slotted plates 60 extend from the baffle lower edge 54 to a position proximate the catalyst outlet 38 and arrayed in a circumferential manner around the inside of the reactor housing 20. By adding the slotted plates 60, the configuration can be changed to reduce the size of the non-flowing region 50 in the reactor, and reduce the overall amount of catalyst needed in the reactor.

In a preferred embodiment, the slotted plates 60 are disposed at an angle at least as great as the angle of repose for the catalyst. The angle of repose is a property of particulate solids. When bulk particles are poured onto a horizontal surface, a conical pile will form, and the angle between the edge of the pile and the horizontal surface is known as the angle of repose. The angle is related to physical properties of the material, such as particle size and shape, density, and the coefficient of friction of the particles. By positioning the slotted plates 60 at an angle at least as great as the angle of repose, the holdup of catalyst is minimized.

Optionally, the reactor 10 further includes a plurality of non-slotted plates 62 where the non-slotted plates 62 are arrayed from the edge of the reactor bed plate 40 to a position proximate to the catalyst outlet 38. This provides for directing the catalyst from the reactor catalyst bed 32 to the catalyst outlet 38 while preventing the accumulation of catalyst in a non-flowing zone 64 below the catalyst bed 32. The non-slotted plates 62 need to be perforated with openings sufficiently small to prevent the flow of catalyst, but to allow the flow of fluid for pressure testing of the vessel. In this optional design, slotted plates can be used where the non-slotted plates 62 are arrayed.

The slotted plates 60 are preferably positioned to have the slots in a vertical orientation. By vertical orientation it is meant that the slots are oriented in the direction of gravity, or the flow of solid catalyst particles. This orientation minimizes abrasion of the catalyst particles over the edges of the slots. The milled plates need to have a sufficient mechanical strength to support the weight of the catalyst against the slotted plates 60 when the reactor 10 is loaded with catalyst and operated with the catalyst moving through the reactor 10. It is preferred that the plates comprise a steel or alloy that is resistant to corrosion, and of sufficient thickness to support the stress of catalyst on the plates 60.

In one embodiment, the slotted plates 60 have a solid particle side and a fluid side and a plate thickness. The solid particle side comprises a milled plate having solid particle side slots formed therein in a parallel manner. The fluid side comprises a milled plate having fluid side slots formed therein in a parallel manner, and where the fluid side slots intersect the solid particle side slots, thereby allowing fluid to pass through the plates 60. While the terms 'milled' and 'milling' are often used to denote standard manufacturing techniques for forming metal plates, it is meant that the terms include any manufacturing method for forming slots, depressions, or holes in metal plates. The terms 'milled' and 'milling' are used for convenience hereinafter. In this embodiment, it is preferred that the solid particle side slots have a width less than or equal to 1 mm, and more preferably that the slots have a width of less than or equal to 0.7 mm. The fluid side slots will have a width greater than the solid particle side slots. The solid particle side slots are milled to a depth from between 0.05 to 0.5 times the thickness of the plate 60, and the fluid side slots are milled to a depth from between 0.5 and 0.95 times the thickness of the plate 60. The slots in the solid particle side are spaced between 2.5 and 5 mm apart from centerline of a slot to the centerline of a neighboring slot.

The slots can span the length of the plates 60, or be segmented to shorter slots aligned longitudinally, or in the vertical direction. The slots preferably are at least 100 mm long and when segmented in the vertical, or longitudinal, direction, have a spacing between them from 5 mm to 30 mm. It is preferred that the slots end at least 20 mm from the end of the plate 60. This provides sufficient material at the end of the plate 60 for affixing the plate 60 to the lower edge of the baffle 30, without damaging the slots.

In another embodiment, the slotted plates 60 have a solid particle side and a fluid side and a plate thickness. The solid particle side comprises a milled plate having solid particle side slots formed therein in a parallel manner. The fluid side comprises a drilled plate having fluid side holes formed therein, and where the fluid side holes intersect the solid particle side slots, thereby allowing fluid to pass through the plates 60. While the term 'drilled' is often used to denote standard manufacturing techniques for forming holes in metal plates, it is meant that the term include any manufacturing method for forming holes, depressions, or holes in metal plates. The term 'drilled' are used for convenience herein. In this embodiment, it is preferred that the solid particle side slots have a width less than or equal to 1 mm, and more preferably that the slots have a width of less than or equal to 0.7 mm. The fluid side holes will have a diameter less than 5 mm, and preferably have a diameter less than 2 mm. The holes are drilled in the fluid side and formed in parallel lines that align and intersect the slots in the solid particle side. The solid particle side slots are milled to a depth from between 0.05 to 0.5 times the thickness of the plate 60, and the fluid side holes are drilled to a depth from between 0.5 and 0.95 times the thickness of the plate 60.

Figure 3:
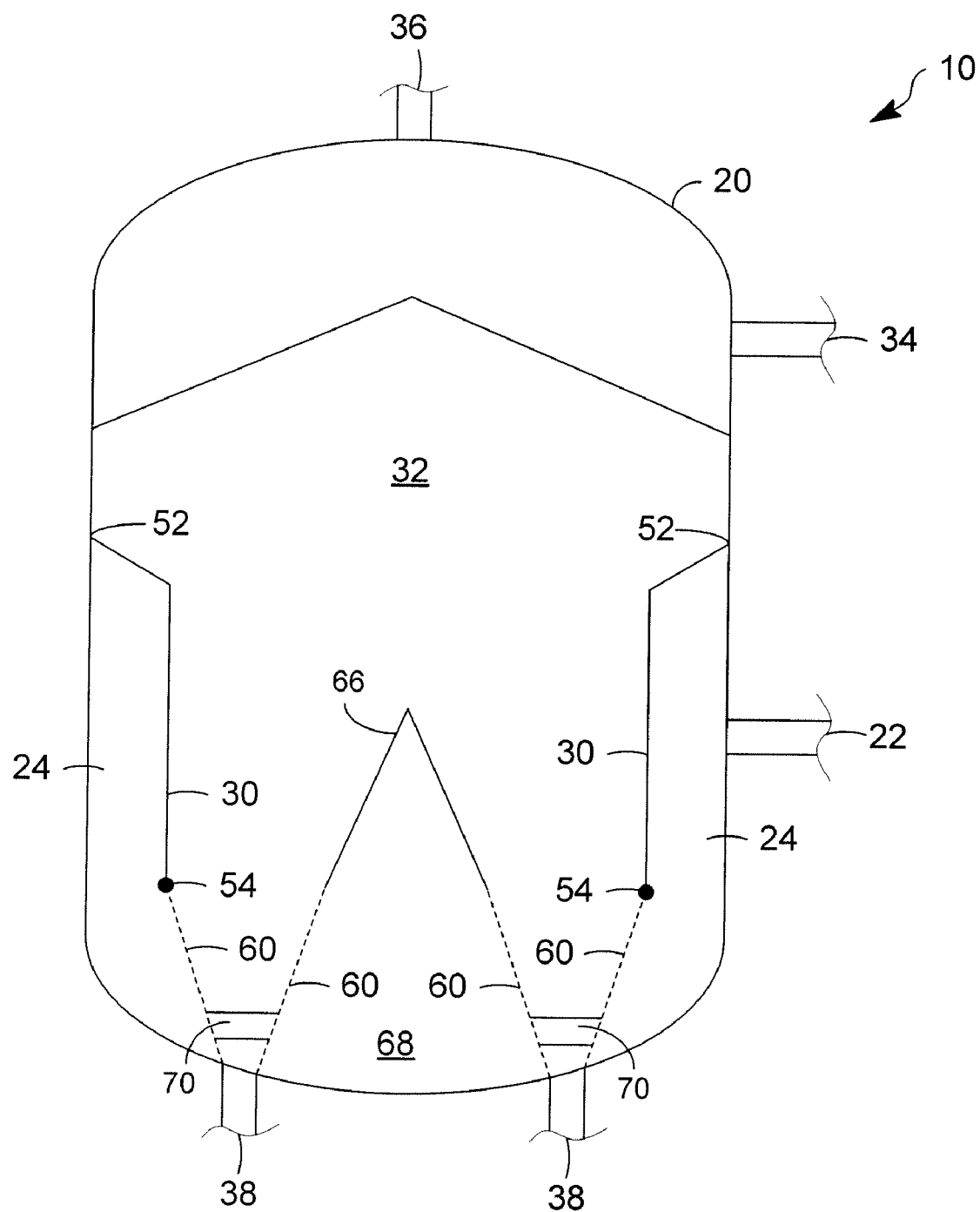
FIG. 3 is an alternate new design for the counter-current flowing reactor.

In another embodiment, as shown in FIG. 3, the reactor 10 includes a volume fill element 66, comprising a conical section having a slope equal to or greater than the angle of repose for the catalyst. The volume fill element 66 occupies space where catalyst becomes inactive due to lack of flow through the reactor 10. The reactor 10 further includes slotted plates 60, as described above, where the plates 60 have an upper edge affixed to the lower edge of the volume fill element 66 and a lower edge proximate to the catalyst outlet 38. This creates a larger void area 68 underneath the volume fill element 66. The reactor 10 further includes at least one vapor pipe 70 having an inlet and an outlet. The vapor pipe 70 allows the flow of process gas from the reactor inlet 22 to the void area 68 for a better distribution of the process gas flowing through the catalyst bed 32. The number of vapor pipes 70 can be determined from operating flow conditions, and the desired distribution of fluid into the void area 68.

The invention increases the utilization of catalyst within the reactor, by increasing the relative amount of flowing catalyst, and reducing the volume of inactive catalyst. As can be seen in the two tables comparing the present counter-current reactor design with the present invention, the invention allows changes that reduce the amount of non-flowing catalyst to less than 1% of the catalyst in the reactor. In addition, while keeping the same active volumes of catalyst the total volume of catalyst has been decreased, and the proportion of inactive volume has been substantially decreased.

TABLE 1 current design volumes of catalyst

| Case | Inactive volume head, m3 | Inactive volume TL to baffle, m3 | Active volume baffle (approx) m3 | Active volume hill, m3 | Total volume m3 | Inactive volume, % of Total | Active non-flowing catalyst, m3 | % of active volume not flowing |
|---|---|---|---|---|---|---|---|---|
| 1 | 0.0449 | 0.0489 | 0.396 | 0.0169 | 0.507 | 19 | 0.0441 | 11 |
| 2 | 0.0670 | 0.0689 | 0.594 | 0.0253 | 0.755 | 18 | 0.0666 | 11 |
| 3 | 0.1309 | 0.1390 | 0.855 | 0.0495 | 1.174 | 23 | 0.1292 | 14 |
| 4 | 0.1991 | 0.2015 | 1.277 | 0.0755 | 1.753 | 23 | 0.1987 | 15 |
| 5 | 0.3592 | 0.3787 | 1.716 | 0.1360 | 2.590 | 28 | 0.3553 | 19 |
| 6 | 0.5362 | 0.5368 | 2.536 | 0.2031 | 3.812 | 28 | 0.5364 | 20 |
| 7 | 1.0472 | 1.0681 | 3.811 | 0.3969 | 6.323 | 33 | 1.0437 | 25 |
| 8 | 1.9726 | 1.9646 | 6.144 | 0.7491 | 10.830 | 36 | 1.9763 | 29 |

TABLE 2 new design volumes of catalyst

| Case | Inactive volume head, m3 | Active volume baffle (approx) m3 | Active volume hill, m3 | Total volume m3 | Inactive volume, % of Total | Active non-flowing catalyst, m3 | % of active volume not flowing |
|---|---|---|---|---|---|---|---|
| 1 | 0.0345 | 0.3959 | 0.0170 | 0.4474 | 8 | 0.000793 | 0.19 |
| 2 | 0.0626 | 0.5938 | 0.0252 | 0.6816 | 9 | 0.001331 | 0.22 |
| 3 | 0.1090 | 0.8549 | 0.0496 | 1.0135 | 11 | 0.002435 | 0.27 |
| 4 | 0.1965 | 1.2774 | 0.0756 | 1.5492 | 13 | 0.004069 | 0.3 |
| 5 | 0.3095 | 1.7160 | 0.1359 | 2.1614 | 14 | 0.006779 | 0.37 |
| 6 | 0.5482 | 2.5361 | 0.2030 | 3.2873 | 17 | 0.01118 | 0.41 |
| 7 | 1.0152 | 3.8106 | 0.3970 | 5.2228 | 19 | 0.02109 | 0.5 |
| 8 | 2.0632 | 6.1437 | 0.7490 | 8.9558 | 23 | 0.04155 | 0.6 |

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A cylindrical reactor comprising:
a reactor housing having a gas inlet, a gas outlet, a catalyst inlet and a catalyst outlet;
an annular baffle having a upper edge and a lower edge, and disposed within the reactor housing, wherein the baffle upper edge is affixed to the reactor housing over the gas inlet, and the baffle lower edge extends to a position below the gas inlet; and
a plurality of slotted plates, wherein the slotted plates are arrayed from the baffle lower edge to a position proximate the catalyst outlet.

2. The reactor of claim 1 wherein the plates are disposed at an angle at least as great as the angle of repose for the catalyst.

3. The reactor of claim 1 wherein the plates are positioned such that the slots have a vertical orientation.

4. The reactor of claim 1 wherein the slotted plates have a solid particle side and a fluid side and a plate thickness, and wherein the solid particle side comprises a milled plate having solid particle side slots formed therein in a parallel manner and the fluid side comprises a milled plate having fluid side slots formed therein in a parallel manner, and where the solid particle side slots intersect the fluid side slots to provide a plate allowing fluid to flow through the plate.

5. The reactor of claim 4 wherein the solid particle side slots have a width less than or equal to 1 mm, and the fluid side slots have a width greater than the solid particle side slots.

6. The reactor of claim 5 wherein the solid particle side slots have a width less than or equal to 0.7 mm.

7. The reactor of claim 4 wherein the solid particle side slots have a depth from between 0.05 and 0.5 times the thickness of the plate.

8. The reactor of claim 4 wherein the fluid side slots have a depth from between 0.5 and 0.95 times the thickness of the plate.

9. The reactor of claim 4 wherein the solid particle side slots have a length of at least 100 mm with a spacing between longitudinally oriented slots of at between 5 mm and 30 mm.

10. The reactor of claim 1 wherein the solid particle side slots extend to at least 20 mm from the end of the plate.

11. The reactor of claim 1 wherein the slotted plates have a solid particle side and a fluid side and a plate thickness, and wherein the solid particle side comprises a milled plate having solid particle side slots formed therein in a parallel manner and the fluid side comprises a side having holes wherein the holes are formed and intersect the slots to allow for the passage of fluid through the plate.

12. The apparatus of claim 11 wherein the holes in the fluid side are formed in parallel lines and aligned with the slots in the first side.

13. The apparatus of claim 11 wherein the holes in the fluid side have a diameter of less than 5.0 mm.

14. The apparatus of claim 13 wherein the holes in the fluid side have a diameter of less than 2.0 mm.

15. The apparatus of claim 1 wherein the slots in the solid particle side are spaced between 2.5 and 5 mm apart.

16. The reactor of claim 1 further comprising a volume fill element, for filling volume at the bottom of the reactor.

17. The reactor of claim 16 wherein the volume fill element is a conic section having a slope equal to or greater than the angle of repose for the catalyst.

18. The reactor of claim 17 wherein the volume fill element has a lower edge at the level of the baffle lower edge, further comprising a plurality of slotted plates, wherein the slotted plates are arrayed from the volume fill element lower edge to a position proximate the catalyst outlet, thereby creating a void space underneath the volume fill element.

19. The reactor of claim 18 further comprising at least one vapor pipe having an inlet in fluid communication with the reactor gas inlet and an outlet in fluid communication with void space underneath the volume fill element.

20. The reactor of claim 16 where the volume fill element comprises a reactor bed plate positioned proximate to the lower edge of the baffle to create an annular opening for catalyst to flow through; and a conical section affixed to the reactor bed plate.

21. The reactor of claim 20 further comprising:
a plurality of non-slotted plates, wherein the non-slotted plates are arrayed from the edge of the reactor bed plate to a position proximate the catalyst outlet.

* * * * *